July 28, 1964 E. ORSHANSKY, JR 3,142,229
HYDRAULIC MOTOR
Filed Feb. 20, 1962 6 Sheets-Sheet 1

INVENTOR:
ELIAS ORSHANSKY, JR.
BY
ATTORNEYS

July 28, 1964  E. ORSHANSKY, JR  3,142,229
HYDRAULIC MOTOR

Filed Feb. 20, 1962  6 Sheets-Sheet 4

INVENTOR.
ELIAS ORSHANSKY, JR.
BY
ATTORNEYS

INVENTOR:
ELIAS ORSHANSKY, JR.
BY
ATTORNEYS

PISTON CYCLE DURING 40° WHEEL ROTATION

INVENTOR:
ELIAS ORSHANSKY, JR.
BY
ATTORNEYS

United States Patent Office 3,142,229
Patented July 28, 1964

3,142,229
HYDRAULIC MOTOR
Elias Orshansky, Jr., 2935 Pacific Ave., San Francisco, Calif., assignor of one-half to Robert E. Hatch, San Francisco, Calif.
Filed Feb. 20, 1962, Ser. No. 174,425
8 Claims. (Cl. 91—188)

This invention relates to a hydraulic motor and more particularly relates to a hydraulic motor which is suitable for use as a wheel motor in a vehicle, although it will be obvious that this is only one of the many possible applications of the motor.

In heavy duty vehicles, it is important to provide a drive which provides an efficient conversion of energy into tractive power under all operating conditions. Only an infinitively variable ratio transmission can make it possible to operate the engine under the proper speed and torque conditions for maximum efficiency regardless of the commands of the wheels. Thus, the transmission of the present invention provides the necessary high torque for starting and at the same time allows efficient high speed operation.

Therefore, one object of the present invention is to provide a hydraulic motor for use in vehicles which permits an efficient conversion of energy under all driving conditions.

Another object of this invention is to provide a drive system in which a minimum number of parts are rotating parts.

Another object of this invention is to provide a hydraulic motor which has self-aligning features and which does not require extremely exacting manufacturing tolerances.

A further object of this invention is to provide means for eliminating side thrust from the pistons of a hydraulic motor.

Another object of this invention is to provide a motor having anti-friction bearings for side load reaction.

Still another object of this invention is to provide a novel valve sequence to compensate for compressibility of the hydraulic fluid resulting in a high efficiency.

A further object of this invention is to provide in a preferred embodiment a motor having paired pistons operating on both sides of a cam follower so that there will be substantially no side thrust on the cam follower.

Another object of this invention is to provide a hydraulic motor having extremely low friction losses.

Another object of this invention is to provide a multiple cylinder hydraulic motor having cross firing to minimize main bearing loading.

A still further object of this invention is to provide a motor having a variable displacement.

Other objects will be apparent from the specification which follows.

In the drawings forming part of this application:

Figure 1:
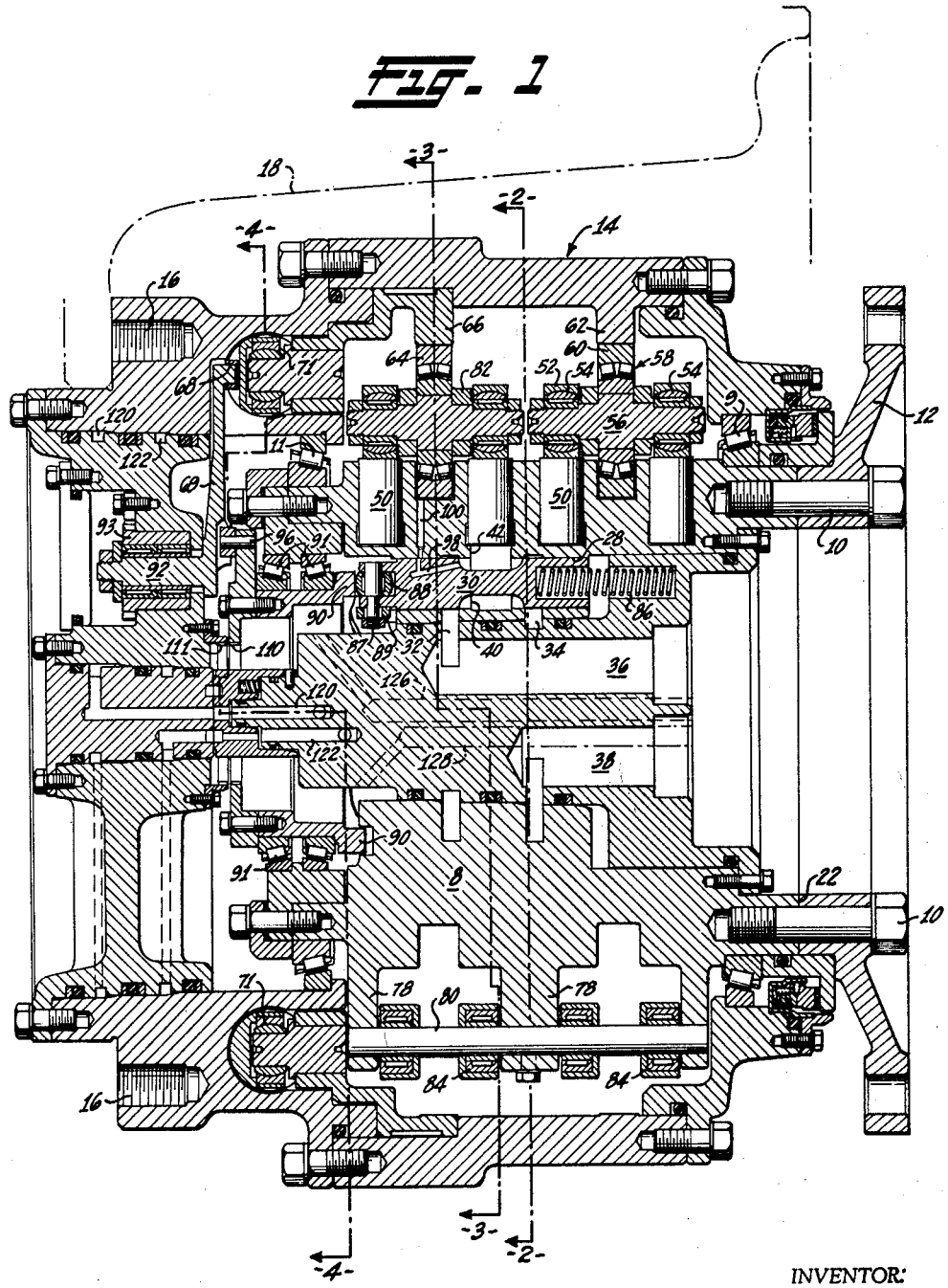
FIGURE 1 is a side sectional view through a hydraulic motor embodying the present invention.
Figure 2:
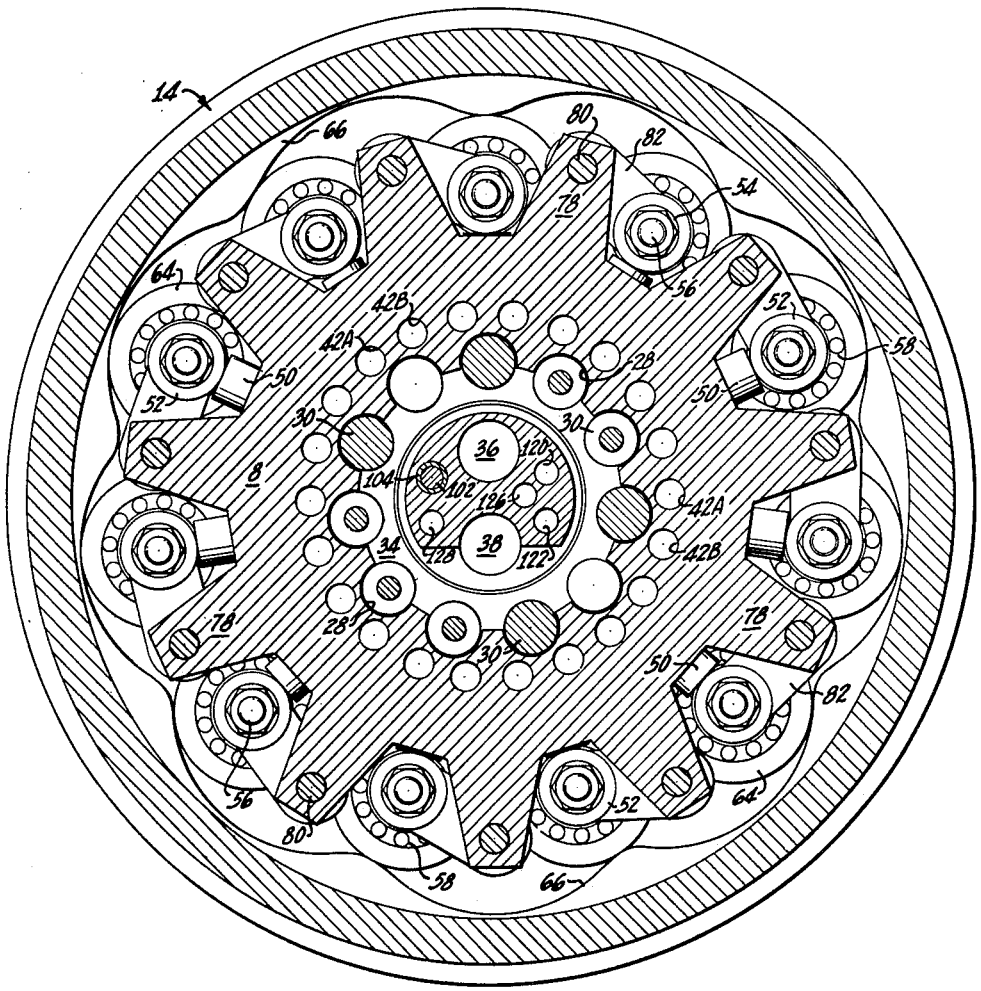
FIGURE 2 is a sectional view on the lines 2—2 of FIGURE 1.
Figure 3:
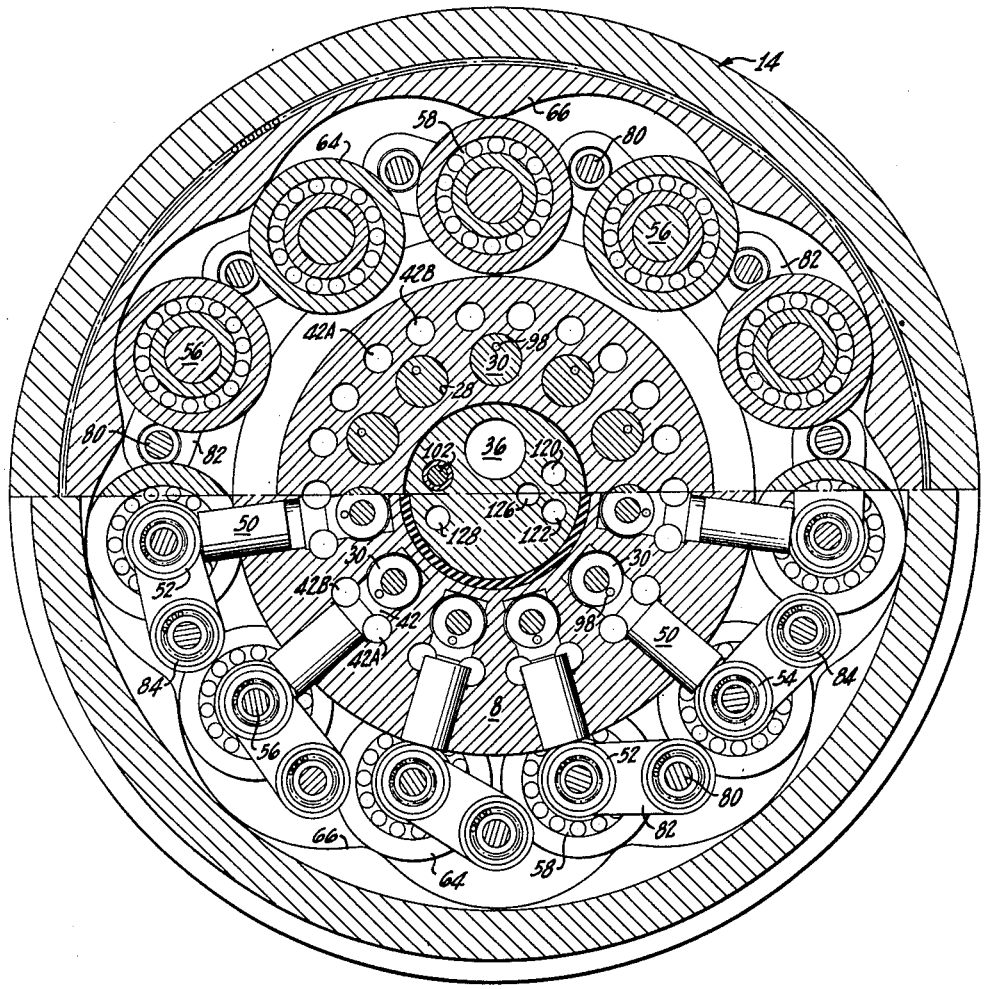
FIGURE 3 is a sectional view on the lines 3—3 of FIGURE 1.

Turning now to a description of the drawings by reference characters there is shown a motor having a central hub section generally designated 8 attached by means of suitable bolts 10 to a flange 12, said flanges serving to fasten the motor to the body of a vehicle, not shown.

Surrounding the central hub 8 is the housing or rotating portion of the motor generally designated 14 having suitable attachment means 16 to which a vehicle wheel, shown in phantom at 18, may be attached. The housing is mounted on the hub by bearings 9 and 11.

The general operation of the device is that the inner hub 8, which remains stationary with respect to the vehicle, is provided with a plurality of radial cylinders each of which has a piston adapted to press against driving cams located in the rotating member 14 causing the rotation thereof. One of the driving cams in the rotating member 14 is adjustable relative to the other driving cam and the pistons are paired in such a manner that the effective displacement of the motor per stroke can be altered by the cam positioning. Valves are provided within the stationary member which oscillate by being pressed against a valve cam in the rotary member as is hereinafter described in detail.

In order not to alter valve timing as the driving cams are adjusted, means are provided to adjust the valve cam position concurrently with adjusting the driving cams with respect to each other, so that no oil trapping or cavitation takes place.

Figure 5:
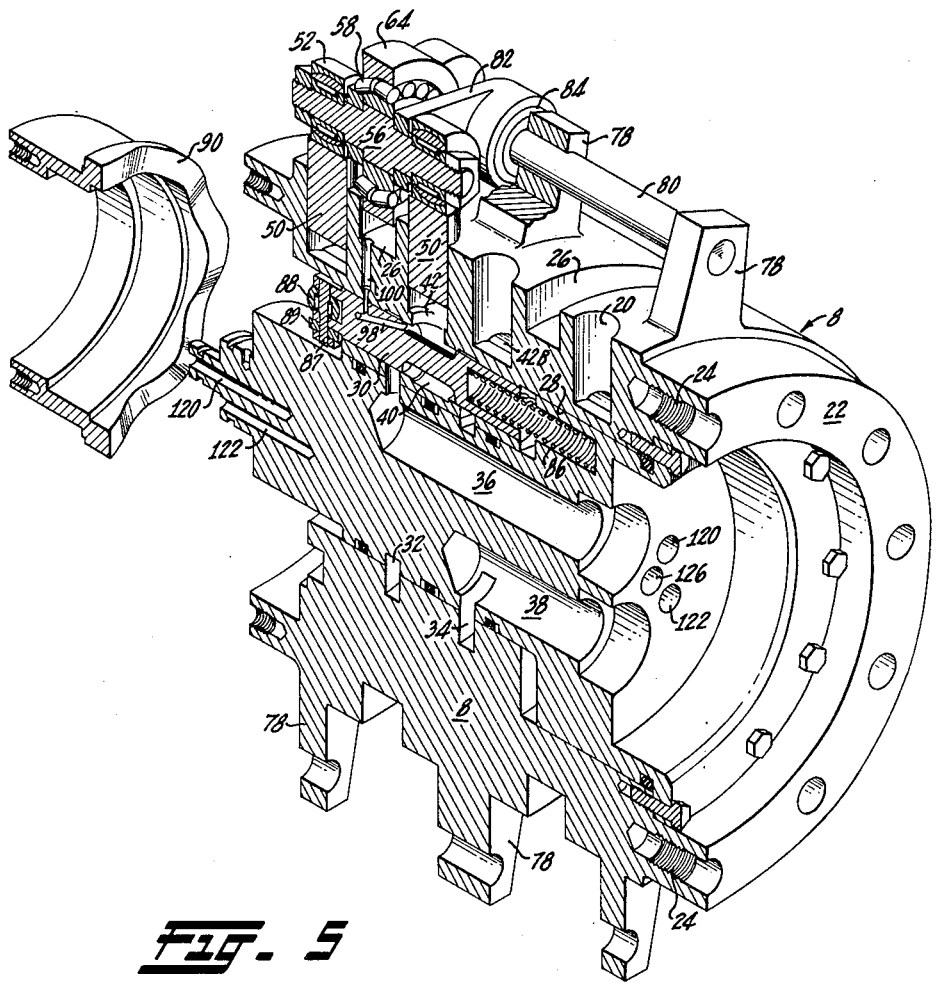
FIGURE 5 is a partial isometric sectional view of the motor of FIGURE 1.

The cylinder block generally designated 8 has a plurality of cylinders 20 formed radially therein, said cylinders being formed in banks of four abreast. In the embodiment of the invention illustrated, 11 banks of cylinders are employed although, as will be later explained, other numbers of banks can be used. The block is provided with a flat shoulder 22 having threaded holes 24 therein for receiving the attachment bolts 10. The block is also provided with slots 26 between the first and second and third and fourth cylinders to serve as clearances for bearings hereinafter described. Under each bank of cylinders there is an axial valve chamber 28 having a sliding valve body 30 therein. Communicating with the inner portions of each of valve chambers 28 are two annular slots or circumferential passages 32 and 34. Passage 32 communicates with a line 36 while the passage 34 communicates with a line 38, said lines 36 and 38 leading to the exterior of the motor. In this manner, the slider 30 is adapted to close off either or both of the passages 32 and 34 or to open one of the passages 32 or 34 to the central open portion 40 of the valve body. From the openings 28 a passage 42 leads to passages 42A and 42B which communicate with the bottoms of all four cylinders in the corresponding bank. By the movement of the valve body member 30, as is hereinafter explained, either the passage 32 or the passage 34 may be placed in fluid communication with the passage 42 or both of the passages 32 and 34 can be sealed off as is shown in FIGURES 1 and 5.

Figure 4:
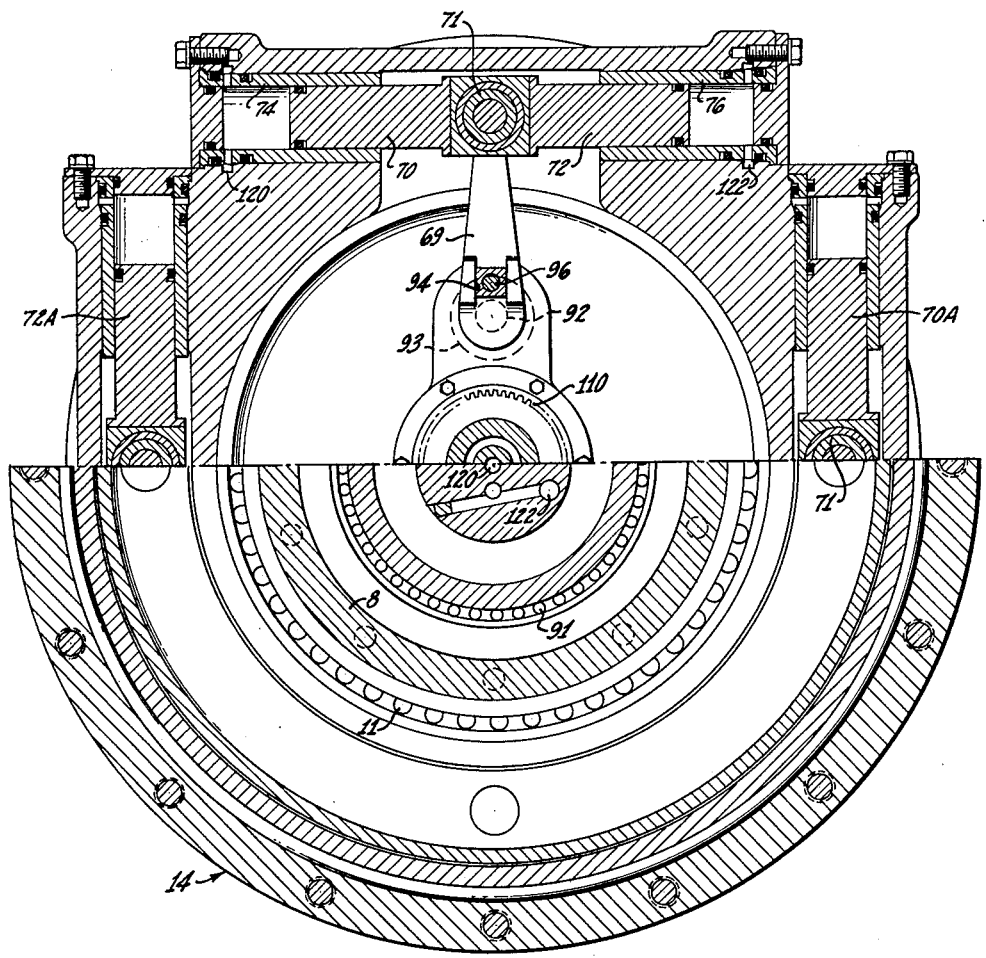
FIGURE 4 is a split sectional view on the lines 4—4 of FIGURE 1.

A piston 50 is fitted into each of the cylinders and the outer end of each piston in turn rests on the outer race 52 of a spherical bearing 54. The bearings 54 for each pair of pistons are supported on a cross arm 56, each of which is provided with a spherical roller bearing 58. The outer race 60 of bearing 58 serves as a cam follower so that, referring specifically to FIGURE 1, the right hand pair of pistons and their associate bearings bear against cam 62. The opposite pair of pistons are similarly connected and the cam follower 64 bears against cam 66. The cam 62 is fixed relative to the housing 14 while the cam 66 generally moves with the housing 14 but can be rotated a short angular distance from coincidence with cam 62 by the pistons 70 and 72 which act on bearing 71 and which operate in small cylinders 74 and 76 located at the top of the motor. Four pairs of cylinders are preferably employed and FIGURE 4 shows portions of two additional pairs, it being understood that pistons 70A and 72A correspond in function to 70 and 72 respectively. If the peaks of the cams 62 and 66 are brought into coincidence, the motor will have maximum displacement while other percentages of displacement can be achieved by shifting the cam 66 relative to the cam 62. Thus, the effective displacement of the motor would be reduced to zero if the peaks of one set of cams were brought into coincidence with the valleys of the other, which extreme condition would never be actually used in practice. Further the cams 62 and 66 may be provided with dwells at one or both ends of piston travel to avoid interport leakage and to reduce compressibility effects.

In order to maintain the cam followers 60 and 64, and the corresponding followers on other banks, in alignment a rocking arm arrangement is used to take torque reactions. This consists of a plurality of sets of arms 78 extending from the hub 8, each set of which carries a rod 80, there thus being one rod for each bank of cylinders. The rod 80 carries a plurality of arms 82, each of which is mounted on a bearing as at 84. The arms 82 in turn extend to bearing surfaces on each side of bearings 58 on the cross members 56 so that the cam followers are confined to a rotary path around the rod 80. Although this results in an arcuate movement rather than the straight up and down movement which would be most desirable, the angle through which the arms 82 move is so small that the departure from the desired true reciprocating motion is not great. Further, the motion across the piston is a rolling motion rather than a scrubbing motion.

In order to provide rotary motion, it is necessary that the valve body members 30 be reciprocated so that the passages 32 and 34 can be alternately brought into communication with the passages 42. This is achieved by utilizing a spring 86 at one end of the valve body 30 which biases the opposite end, which is provided with a bearing 88, against a cam 90 which in general rotates with the member 14. Bearing 88 has an extending shaft 87 carrying a bearing 89 which is free to slide in a slot in the hub 8, preventing the valve body 30 from rotating. The cam 90 is not attached to the member 14 but a slight rotational movement relative thereto must be provided since it is necessary to slightly adjust the position of the cam 90 when the cam 66 is adjusted relative to the cam 62 so that the inlet and outlet points on the cam 90 will correspond to the net minimum and maximum displacement points of the cylinder banks. This is achieved by mounting the cam 90 on bearings 91 so that it can rotate with respect to the hub and can be adjusted slightly with respect to the housing 14 by connecting it to the arm 69, the upper end of which pivots on bearing 68. The arm 69 is also pivoted on the shaft 92 and an intermediate point on the arm 69 is grooved as at 94, the groove receiving pin 96 which is attached to the cam 90 as is shown in FIGURE 1. The relative positions of bearing 68 and pin 96 in groove 94 on the arm 69 are selected to give the proper degree of movement to the cam 90 as the cam 66 is moved. Shaft 92 is mounted on an eccentric bushing 93 for precise positioning of the valve cam with respect to the driving cams.

Figure 6:
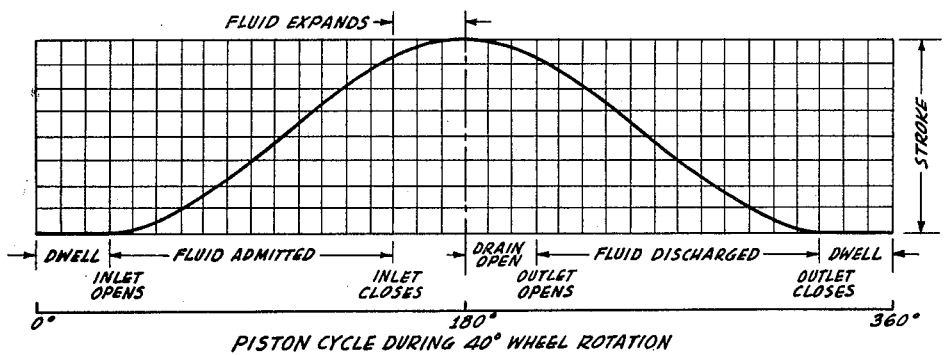
FIGURE 6 is a graph showing the novel valve action of the motor of the present invention.

It will be noted that a passage 98 is provided in the valve body 30 which can connect with the passage 100 at certain positions of the valve body 30. The line 100 extends into the hollow casing of the motor so that any oil which passes through this line goes to the sump. The reason for this is explained in FIGURE 6. In a motor such as this, operating under pressures of the order of thousands of pounds of oil pressure per square inch, there is a substantial compression of the oil and if it were merely discharged at the end of a stroke, there would be a considerable loss of efficiency since the oil would expand without doing any work. To remedy this, the inlet is closed slightly before top dead center (180° piston travel) so that as the piston completes its upward stroke, the oil expands, releasing its potential energy while doing useful work, reaching substantially zero pressure at top dead center. Since the motor must be capable of operating in either direction, depending upon whether line 36 or line 38 is used as the high pressure inlet line, the cam timing must be symmetrical, e.g. the outlet must open at the same distance past top dead center as the inlet closed prior to dead center. With this restriction, as the piston starts downward, it would normally be moving against a closed valve so that instead of discharging the oil, it would merely be compressing it. However, the line 98 opens at top dead center, i.e. slightly before the regular outlet valve opens, thus relieving the pressure which would otherwise build up until the regular valve could open. Although this allows a small amount of oil to be discharged into the sump, the loss is minor and not serious.

Figure 7:
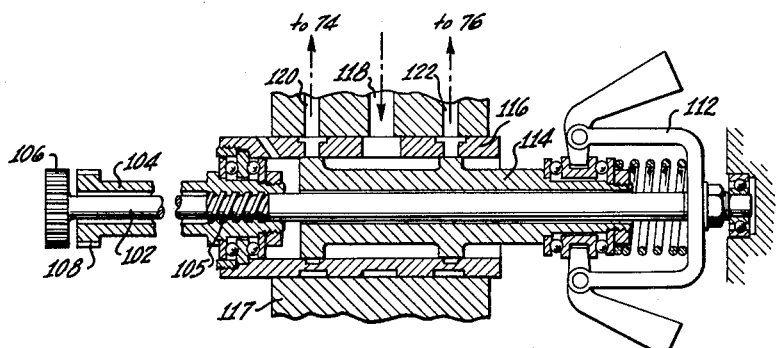
FIGURE 7 is a sectional view of a suitable control valve for use with the motor of the present invention.

In FIGURE 7 a control system for actuating the cam positioning pistons is shown. Two concentric shafts are employed, namely an inner shaft 102 and an outer shaft 104 which are threaded together at 105. These shafts extend through the hub and terminate in the respective gears 106 and 108. One of these meshes with a gear 110 mounted on the cam ring 90 while the other meshes with a corresponding gear 111, mounted on the housing 14. If the position of the cam with respect to the housing does not change, both of these gears will rotate together and will actuate the governor 112 which in turn is connected to one end of a rotating valve body 114 so that if speed increases, the valve body 114 will be moved to the right in FIGURE 7. The valve body moves in a sleeve 116 slidably mounted in block 117 having three passages therein, namely the high pressure oil passage 118 and passages 120 and 122 which lead to the cylinders 74 and 76 respectively. Therefore, as speed increases, line 118 will be placed in communication with line 122 causing liquid to enter the cylinders 76, adjusting the cams for higher speed operation. As this happens, a feedback action occurs since there will be a relative movement between the gears 106 and 108 moving the shafts 102 and 104 with respect to each other by the action of the threaded connection 105 moving (in this instance) the shaft 102 to the right restoring balance. By the proper selection of valves, the most efficient cam action is thereby achieved.

The direction of rotation of the motor is determined by whether high pressure oil is supplied to connection 36 or 38, it being understood that oil is supplied to one line while the other acts as a return line, depending upon the desired direction of rotation desired. Since leakage is relatively small, and, under many conditions insufficient to properly lubricate and cool the motor, a line 126 is provided for the introduction of oil for this purpose while another line 128 serves as a drain for the casing of the motor and thus serves to remove both the oil introduced for lubrication and cooling as well as any oil which may leak from the operation of the motor.

Figure 8:
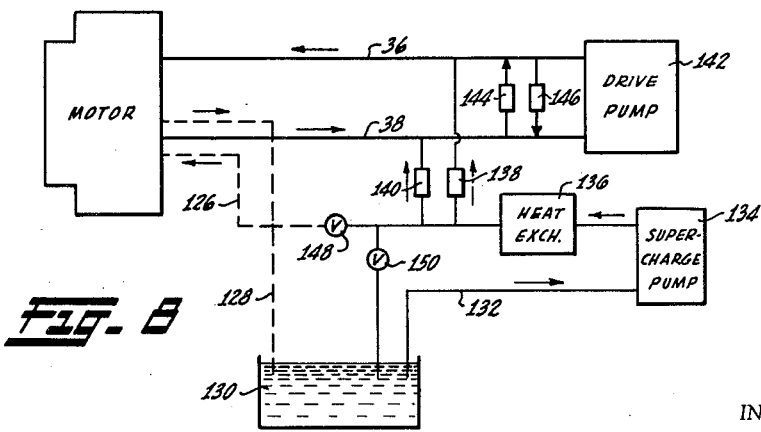
FIGURE 8 is a diagram showing the path of liquid flow to and from the motor of the present invention.

FIGURE 8 is a schematic diagram of an operating system which may be used to actuate the motor. Here a sump 130 receives drainage oil through the line 128. Oil is picked up by the line 132, passed through the supercharge pump 134, through the heat exchanger, and then through the check valves 138 or 140 into one of the lines 36 or 38. In the example shown, the low pressure line is line 38 so that the oil would pass through the check valve 140 into the line 38 through the main drive pump 142 whereupon it would be discharged to the line 36 into the motor. The valves 144 and 146 are merely high pressure relief valves. Oil passing from the heat exchanger 136 may be also discharged through the pressure controlling valve 148 into the line 126 for lubrication and cooling purposes. If more oil is available from the supercharge pump than is needed for supplying the drive pump and the cooling needs, the excess is discharged through the pressure relief valve 150 back into the sump 130.

Although this device has been described as a motor, it will be obvious that it could also be operated as a pump.

The motor has been described as having eleven pistons per bank and nine lobes on each of the cams. These numbers have been established by trial and error as being optimum for a large military vehicle but it will be obvious to those skilled in the art that a smaller or larger number of pistons or lobes might be used. The purpose of having many cam lobes is to permit the pistons to make many strokes per revolution so that the motor develops much more torque than a motor would of similar dimensions wherein only one stroke per revolution is made. However, there is a practical upper limit to the number of lobes which can be used since the greater the number of lobes, the sharper the cam peaks and the greater the tendency of the cam follower to jump off of the peaks as speed is increased. Likewise, the number of cylinders can be varied and generally it is preferred to use an odd number of cylinders since this results in a smoother fluid flow than an even number. If fewer cylinders are employed, the cam roller bearing loading must be larger and force acting upon the cam followers becomes high, requiring large diameter cam followers. Generally speaking, the number of lobes and the number of pistons should not be divisible by a whole number since the flow will become very rough and the operation of the motor will be equivalent to that of one having only two or three pistons, since several of the pistons will be firing at the same time. There should not be the same number of pistons as there are lobes since this is equivalent to a one-cylinder motor which can stop on dead center. By selecting a proper number of cam lobes and cylinders, such as 9 and 11, the radial loads on bearings 9 and 11 are substantially balanced out.

I claim:

1. A fluid operated motor comprising a stationary hub and a housing mounted for rotation on said hub, a plurality of banks of radial cylinders in said hub, pistons in said cylinders, said pistons extending outwardly from said cylinders, each bank of cylinders comprising at least a first and a second piston, bearings operatively connected to the ends of the pistons, said bearings being in contact with one of two annular driving cams mounted within the housing whereby reciprocation of the pistons imparts a rotary motion to the housing, means whereby the cams can be rotated slightly with respect to each other to vary the effective displacement of the motor and valve means for controlling the flow of a hydraulic fluid to said cylinders wherein the valve means comprises a plurality of axial, sliding valves mounted within the stationary hub, said sliding valves being actuated by a valve cam mounted for rotation with the housing wherein the position of the valve cam is automatically adjusted when the driving cams are rotated relative to each other whereby the inlet and outlet points on the valve cam correspond to the net minimum and maximum displacement points of the cylinder banks.

2. The motor of claim 1 wherein said hub has a plurality of pivot points tangentially offset from each bank of cylinders, with swinging arms extending from the pivot points to the bearings whereby said arms can move through a small arc around said pivot points, said arms taking the torque reaction and removing side thrust from the pistons.

3. The motor of claim 2 wherein the driving cams have a plurality of lobes.

4. The motor of claim 2 wherein the pivot points are provided with anti-friction bearings.

5. A fluid operated motor comprising a stationary hub and a housing mounted for rotation on said hub, a plurality of banks of radial cylinders in said hub, pistons in said cylinders, said pistons extending outwardly from said cylinders, each bank of cylinders comprising four in line cylinders arranged as a first pair and a second pair of cylinders, a first cross head and a second cross head connecting the tops of the pistons in the first and second pair of cylinders respectively, bearings at the centers of each cross head, each bearing being in contact with one of two annular cams mounted within the housing whereby reciprocation of the pistons imparts a rotary motion to the housing, means whereby the cams can be rotated slightly with respect to each to vary the effective displacement of the motor and valve means for controlling the flow of a hydraulic fluid to said cylinders.

6. The motor of claim 5 wherein said hub has a plurality of pivot points tangentially offset from each bank of cylinders with swinging arms connecting the pivot points and the cross heads whereby each of said cross heads can move independently through a small arc around said pivot points, said arms taking the torque reaction and removing side thrust from the pistons.

7. The motor of claim 6 wherein the driving cams have a plurality of lobes.

8. In a fluid operated motor having a plurality of hydraulic cylinders with valve means with inlets and outlets for admitting and releasing fluid from the cylinders, means for compensating for compressibility of the fluid comprising valve timing which closes the inlet substantially before top dead center and opens the outlet substantially after top dead center and an auxiliary passage in the valve means for releasing fluid from the cylinder at substantially top dead center.

References Cited in the file of this patent

UNITED STATES PATENTS

| | | |
|---|---|---|
| 1,153,613 | Finlay | Sept. 14, 1915 |
| 1,719,693 | Ernst | July 2, 1929 |
| 2,326,464 | Jones | Aug. 10, 1943 |
| 2,712,794 | Humphreys | July 12, 1955 |
| 2,851,952 | Lane | Sept. 16, 1958 |
| 2,872,875 | Mergen et al. | Feb. 10, 1959 |

FOREIGN PATENTS

| | | |
|---|---|---|
| 896,913 | Germany | Nov. 16, 1953 |